United States Patent
Ehrenberg

(10) Patent No.: US 7,628,837 B2
(45) Date of Patent: Dec. 8, 2009

(54) AIR FILTER WITH COMPOSITE END CAP

(75) Inventor: Brian T. Ehrenberg, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 574 days.

(21) Appl. No.: 11/253,965

(22) Filed: Oct. 19, 2005

(65) Prior Publication Data

US 2007/0084169 A1   Apr. 19, 2007

(51) Int. Cl.
B01D 46/00  (2006.01)
(52) U.S. Cl. ............... 55/498; 55/423; 55/428; 55/502; 95/273; 96/189
(58) Field of Classification Search ............ 55/498, 55/502, 428, 423, 466, 476, 510; 95/273; 96/189

See application file for complete search history.

(56) References Cited

U.S. PATENT DOCUMENTS

| | | | |
|---|---|---|---|
| 2,771,156 A | 11/1956 | Kasten et al. | |
| 3,235,633 A | 2/1966 | Holloway et al. | |
| 4,349,363 A | 9/1982 | Patel et al. | |
| 4,720,292 A | 1/1988 | Engel et al. | |
| 5,190,651 A | 3/1993 | Spencer et al. | |
| 5,484,466 A | 1/1996 | Brown et al. | |
| 5,613,992 A | 3/1997 | Engel | |
| 5,690,712 A | 11/1997 | Engel | |
| 5,730,766 A | 3/1998 | Clements | |
| 5,897,676 A * | 4/1999 | Engel et al. | 55/498 |
| 5,938,804 A | 8/1999 | Engel et al. | |
| 6,004,366 A | 12/1999 | Engel et al. | |
| 6,258,145 B1 | 7/2001 | Engel et al. | |
| 6,322,602 B2 | 11/2001 | Engel et al. | |

(Continued)

FOREIGN PATENT DOCUMENTS

DE     195 21 898 A1    12/1996

(Continued)

OTHER PUBLICATIONS

U.S. Appl. No. 11/254,048, filed Oct. 19, 2005, Ehrenberg.

(Continued)

Primary Examiner—Jason M Greene
Assistant Examiner—Karla Hawkins
(74) Attorney, Agent, or Firm—Leydig, Voit & Mayer, Ltd.

(57) ABSTRACT

An air filter element having an inner metal liner, an outer metal liner, a filter media, an annular end cap, and a composite end cap is provided. The annular end cap is formed over the metal liners such that the metal liners are secured and at least a portion of the filter media is sealed. The composite end cap has an annular plastic insert and a foamed urethane portion. The annular plastic insert is tapered upwardly from an outer insert periphery toward a central aperture. The foamed urethane portion is molded about the annular plastic insert such that the metal liners are secured, at least a portion of the filter media is sealed, and an annular groove is formed on an underside of the composite end cap. The annular groove has a plurality of transverse ribs therein. Urethane flashing occurs proximate the central aperture and/or the outer liner periphery.

20 Claims, 12 Drawing Sheets

U.S. PATENT DOCUMENTS

| | | |
|---|---|---|
| 6,413,289 B2 | 7/2002 | Engel et al. |
| 6,447,567 B1 | 9/2002 | Ehrenberg |
| 6,521,009 B2 | 2/2003 | Engel et al. |
| 2002/0162309 A1 | 11/2002 | Schmitz et al. |
| 2004/0065602 A1 | 4/2004 | Moscaritolo et al. |

FOREIGN PATENT DOCUMENTS

| | | |
|---|---|---|
| DE | 198 47 998 A1 | 4/2000 |
| FR | 2261041 | 9/1975 |
| FR | 2268551 | 11/1975 |
| GB | 808476 | 2/1959 |
| GB | 1499922 | 2/1978 |
| JP | 59-020819 | 2/1984 |
| JP | 59-141150 | 9/1984 |

OTHER PUBLICATIONS

*Nelson Industries* v. *Donaldson Co.*, Case No. 93-C-368-S, Oct. 24, 1994, Amended Judgment in a Civil Case, 20 pages.

Sears Craftsman, Owner's Manual 20 Power-Propelled Lawn Mower, Model No. 917.372100, Aug. 20, 1984, pp. 1-24.

Sears Craftsman, Engine Owner's Manual, Model No. 143.354212, Feb. 1, 1985, 11 pages.

3 pages of drawings of Sears Craftsman filter, available before Oct. 19, 2005.

4 pages of photographs of Sears Craftsman filter, available before Oct. 19, 2005.

* cited by examiner

AIR FILTER WITH COMPOSITE END CAP

FIELD OF THE INVENTION

The present invention relates to an apparatus for filtering impurities out of a fluid, and more particularly to an apparatus for filtering impurities out of air flowing through an internal combustion engine.

BACKGROUND OF THE INVENTION

A conventional air filtration system, such as those used in over-the-road trucks and in agricultural, automotive, and off-highway equipment, is employed to prevent dirt and dust from entering the engine with the incoming air supply. These conventional air filtration systems may include, among other things, a housing, an air flow tube associated with the housing, and a removable and replaceable air filter element. Air filter elements may include an inner metal liner, an outer metal liner, a filter media, and a pair of end caps. The filter media is disposed between the metal liners. The end caps generally secure the metal liners on opposing sides of the filter element and seal all or a portion of the filter media. It is known to use metal and polymeric end caps as indicated generally by U.S. Pat. No. 6,413,289 entitled "Reverse Flow Air Filter Arrangement" and U.S. Pat. No. 5,484,466 entitled "Air Filter Element With Radial Seal Sealing Element", the entire disclosures of which are incorporated by reference. The present invention relates to improvements in polymeric end caps.

BRIEF SUMMARY OF THE INVENTION

In one aspect, the invention provides an air filter element that comprises a tubular ring of pleated filter media, a first annular end cap, and a second composite end cap. The tubular ring of pleated filter media extends between first and second ends. The first annular end cap is located over the first end such that the first end is sealed. The second composite end cap comprises an annular insert and a foamed polymeric portion.

The annular insert has a central aperture and an outer insert periphery. The annular insert is tapered upwardly from the outer insert periphery toward the central aperture. The foamed polymeric portion is molded about the annular plastic insert such that the second end is sealed. The foamed polymeric portion engages and projects along a tapered surface of the annular insert toward the central aperture, and flashing to the extent it occurs is formed around and up through the central aperture of the annular insert.

In another aspect, the invention provides an air filter element that comprises an inner liner, an outer liner, a filter media, an annular end cap, and a composite end cap. The outer liner is concentrically spaced outside the inner liner and defines an outer liner periphery. The filter media is disposed between the inner and outer liners. The annular end cap is formed over the inner and outer liners such that the inner and outer liners are secured and at least a portion of the filter media is sealed. The composite end cap comprises an annular plastic insert and a foamed urethane portion.

The annular plastic insert has a central aperture and an outer insert periphery. The annular plastic insert is tapered upwardly from the outer insert periphery toward the central aperture. The foamed urethane portion is molded about the annular plastic insert such that the inner and outer liners are secured, at least a portion of the filter media is sealed, and urethane flashing occurs through the central aperture and along the outer liner periphery. The foamed urethane portion therefore has a foamed periphery that includes a constant diameter portion and a flashed urethane portion.

In a further aspect, the invention provides an air filtration system that comprises a housing, an air flow tube, and an air filter element. The air flow tube is securable to the housing. The air filter element includes an inner metal liner, an outer metal liner, a filter media, an annular end cap, and a composite end cap. The outer metal liner is concentrically spaced outside the inner metal liner and defines an outer liner periphery. The filter media is disposed between the inner and outer metal liners. The annular end cap is formed over the inner and outer metal liners such that the inner and outer metal liners are secured and at least a portion of the filter media is sealed. The composite end cap comprises an annular plastic insert and a composite end cap.

The annular plastic insert has a central aperture and an outer insert periphery. The annular plastic insert is tapered upwardly from the outer insert periphery toward the central aperture. The foamed urethane portion forms a central urethane aperture. The foamed urethane portion is molded about the annular plastic insert such that the inner and outer metal liners are secured, at least a portion of the filter media is sealed, an annular groove is formed on an underside of the composite end cap, the annular groove having a plurality of transverse ribs therein, and urethane flashing occurs through the central aperture and along the outer liner periphery. The foamed urethane portion therefore has a foamed periphery that includes a constant diameter portion and a flashed urethane portion.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
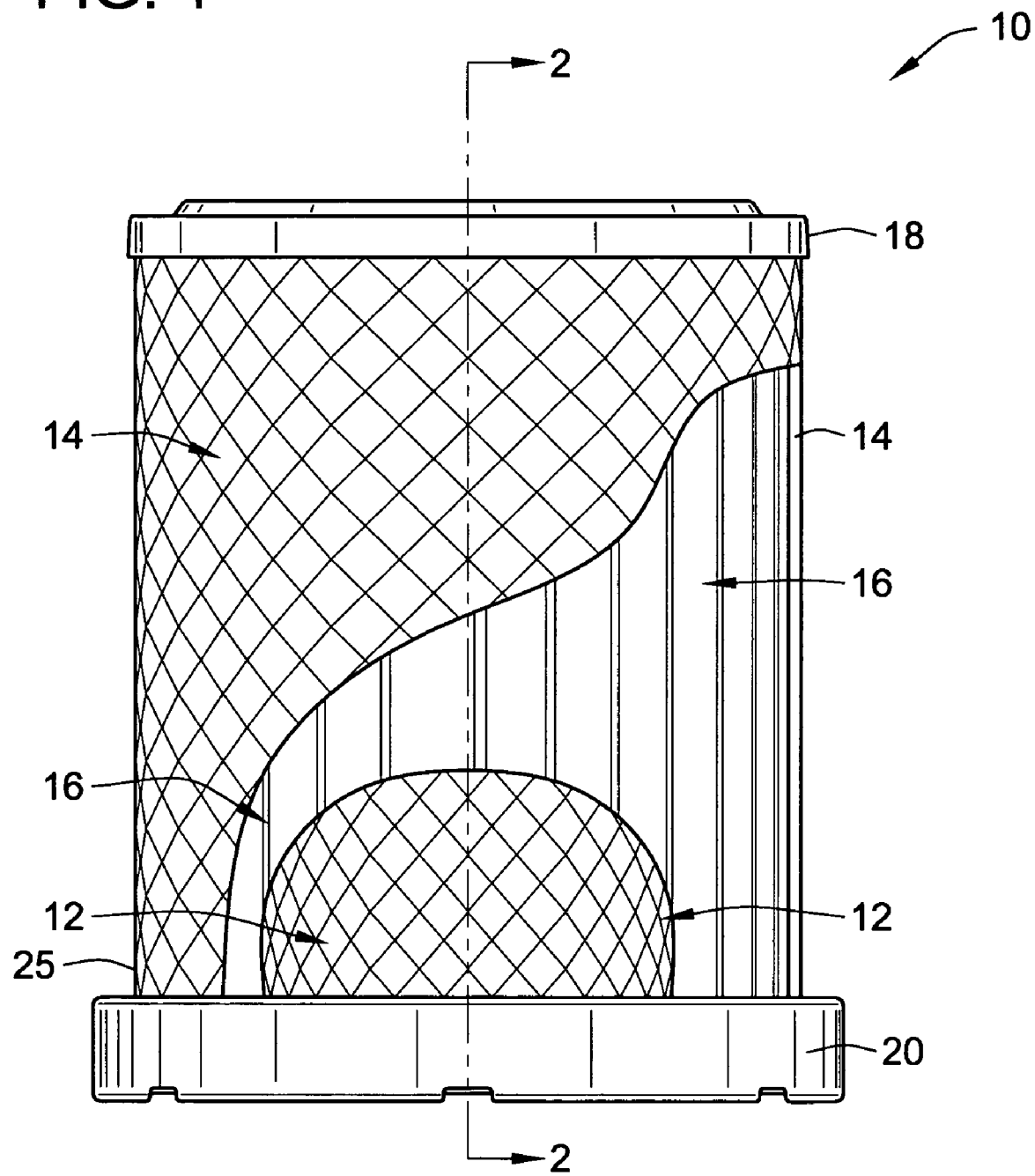
FIG. 1 is a side elevation view of an exemplary embodiment of an air filter element, including a cut-away portion, constructed in accordance with the teachings of the present invention.

Referring to FIG. 1, an air filter element 10 is illustrated. The air filter element 10 may comprise an inner liner 12, an outer liner 14, a filter media 16, an annular top end cap 18, and an annular bottom composite end cap 20. As shown in the cutaway portion of FIG. 1, the outer liner 14 is concentrically spaced outside the inner liner 12 and the filter media 16 is disposed between the inner and outer liners 12, 14. The filter media 16 can be any of the conventional radial flow filter media such as, for example, a cylindrical pleated cellulose filter media. Likewise, the inner and outer liners 12, 14, can be metal cylinders that are expanded, perforated, and the like. The outer liner 14 defines an outer liner periphery 22.

Figure 2:
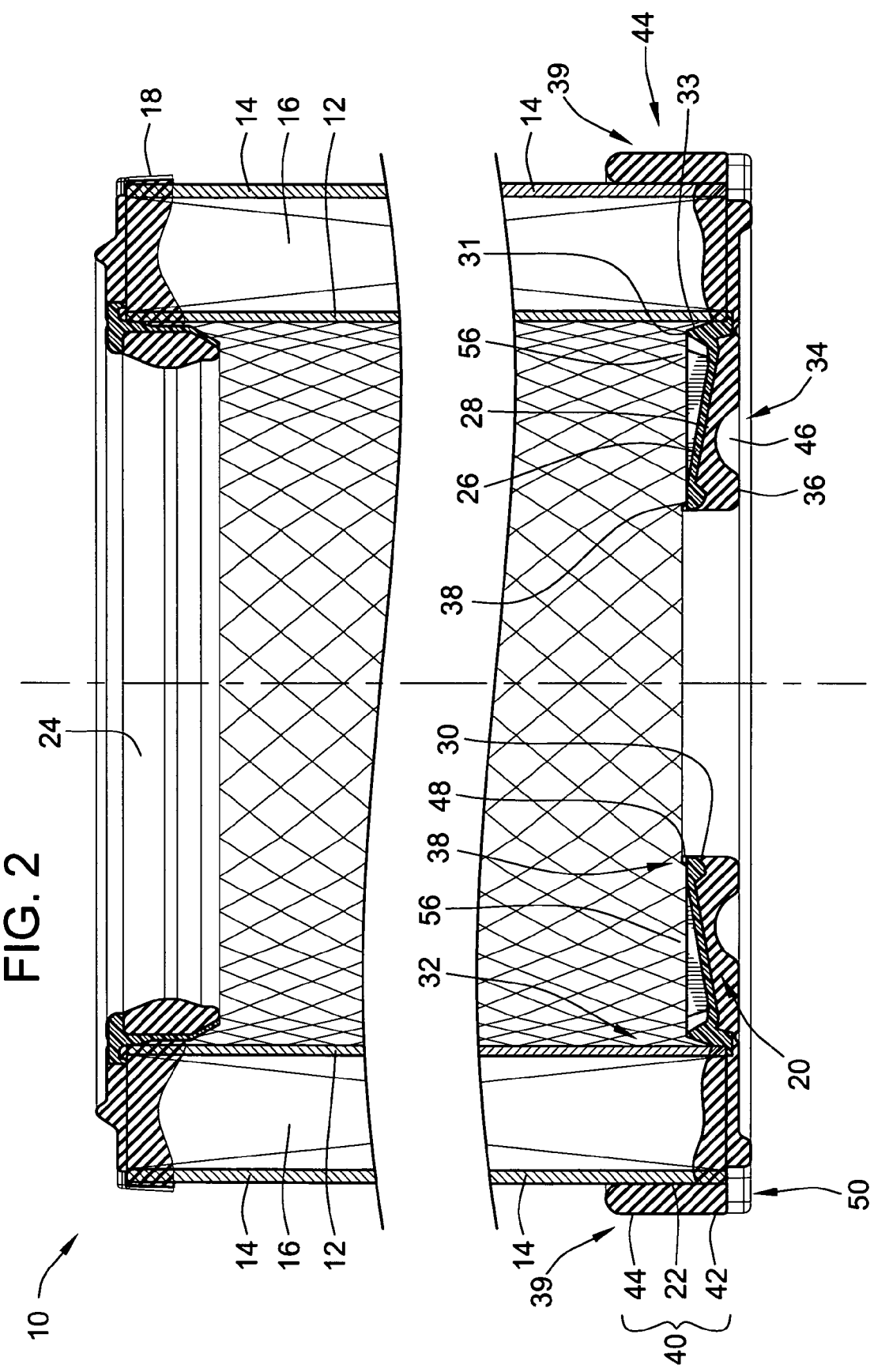
FIG. 2 is a side cross-section view of the air filter element of FIG. 1 taken along line 2-2.

The annular top end cap 18 includes central aperture 24, as illustrated in FIG. 2, and may be constructed of a flexible, compressible material such as, for example, a polymeric material, plastisol, non-foaming urethane, foaming urethane, and the like. In one embodiment, the top end cap 18 may be similar to the end cap disclosed in U.S. Pat. No. 6,447,567. In other embodiments, the annular top end cap 18 can be a potted, pre-formed metal or plastic end cap carrying a gasket if deemed necessary. The annular top end cap 18 is able to secure in place the inner and outer liners 12, 14 as well as seal at least a portion of the filter media 16. The annular top end cap 18 may be vertically disposed above the composite end cap 20 as oriented in FIGS. 1 and 2.

Figure 3:
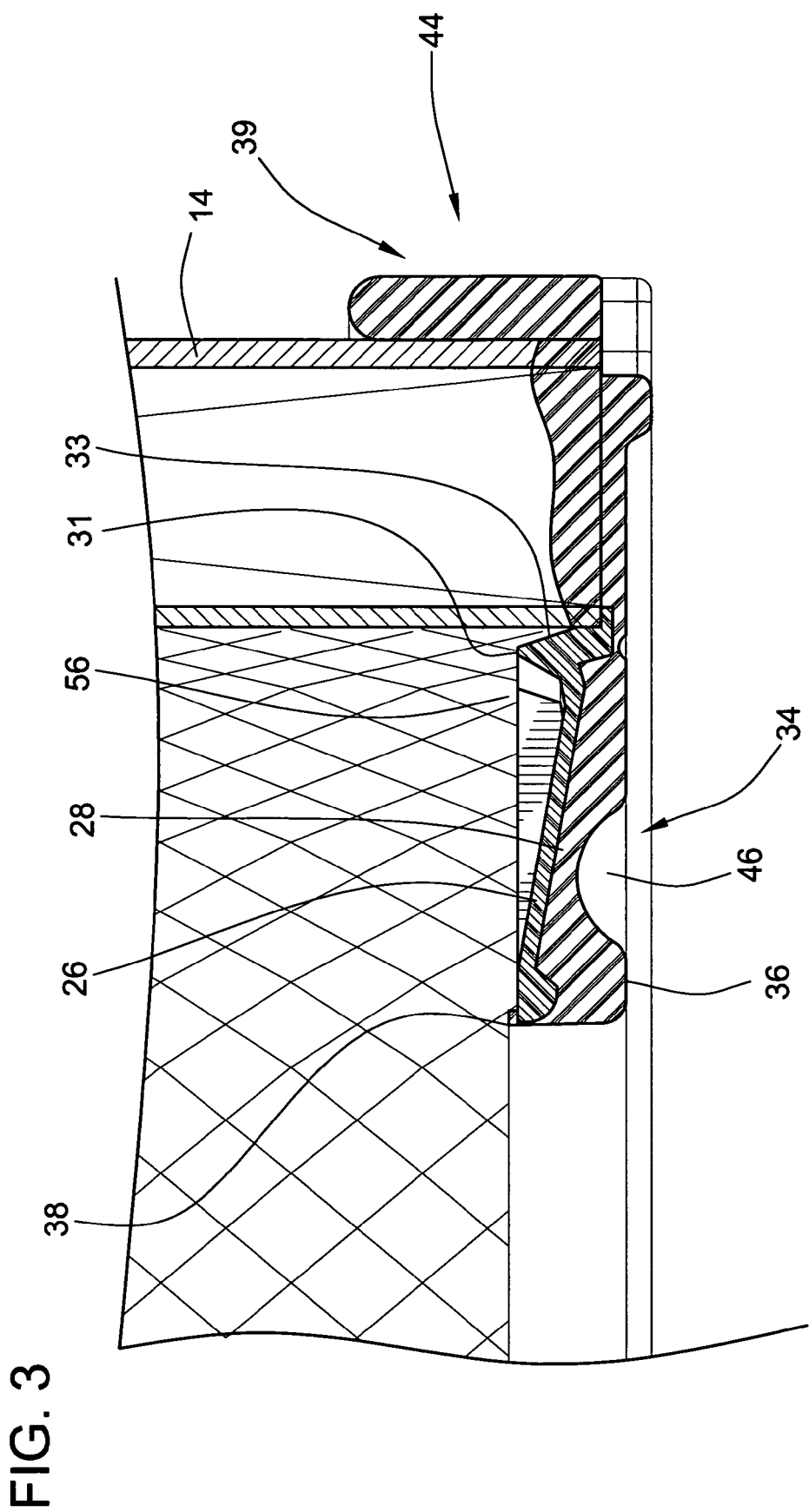
FIG. 3 is an enlarged view of the lower right corner of FIG. 2.

Referring to FIGS. 2 and 3, the composite end cap 20 comprises an annular insert 26, which may be formed from a plastic and/or a metal, and a foamed polymeric portion 28, which may be formed from a foamed urethane (i.e., a foaming urethane). The annular insert 26 has a central aperture 30 and an outer insert periphery 32. The outer periphery may include a wall 31. The wall 31 may include a tapered portion 33. The annular insert 26 is tapered upwardly along surface 35 from the outer insert periphery 32 toward the central aperture 30. The annular insert 26 is upwardly tapered between about two and twenty degrees, and in a second range between about five and fifteen degrees, and in one embodiment at about ten degrees. Therefore, any debris or water that finds its way inside the air filter element 10 migrates toward outer insert periphery 32 and away from central aperture 30. In other words, debris or water is directed or biased, courtesy of the tapered annular insert 26, toward the wall 31. The wall 31 prevents water from entering the media 16. In addition, the tapered portion 33 of the wall facilitates insertion of the media during manufacture.

As and after the foaming urethane hardens (i.e., cures), the inner and outer liners 12, 14, are secured within the composite end cap 20. Likewise, the filter media 16 proximate the end cap 20 may be sealed to prevent short circuitry.

As illustrated in FIGS. 2 and 3, when the foaming urethane is used to construct the foamed urethane portion 28, urethane "flashing" 38, 39 occurs proximate one or more of the central aperture 30 and the outer liner periphery 22. Urethane flashing 38, 39 is the result of the foaming urethane expanding as the foaming urethane cures (i.e., hardens). The urethane portion 38 is located inside the central aperture 30 and forms the inner diameter 48. Because expansion of the foaming urethane is unpredictable, the flashing 38 generates an outer periphery 40 on the composite end cap 20 that includes a constant diameter portion 42 and an uneven and/or non-symmetrical flash urethane portion 44.

Figure 4:
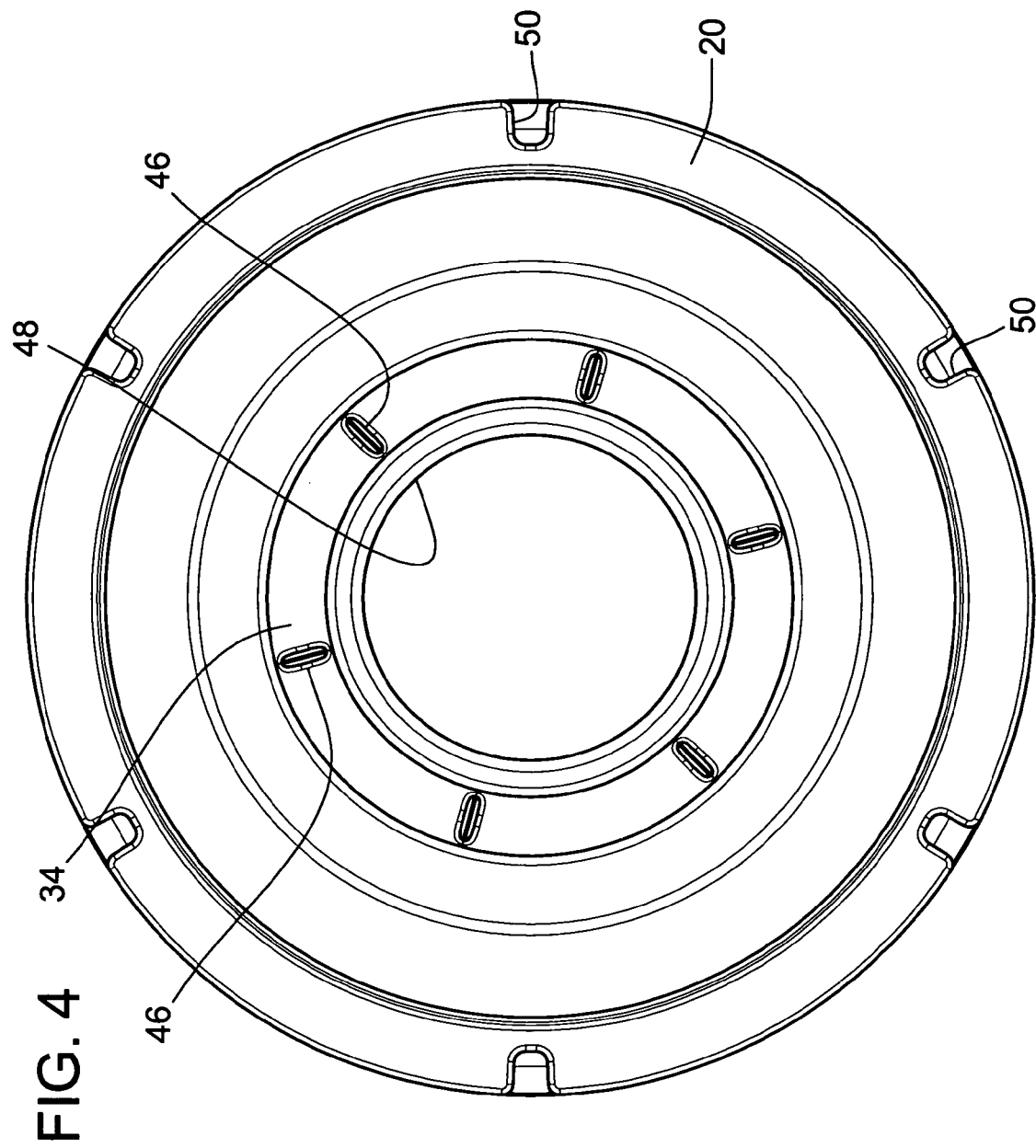
FIG. 4 is a bottom plan view of the air filter element of FIG. 1.
Figure 6:
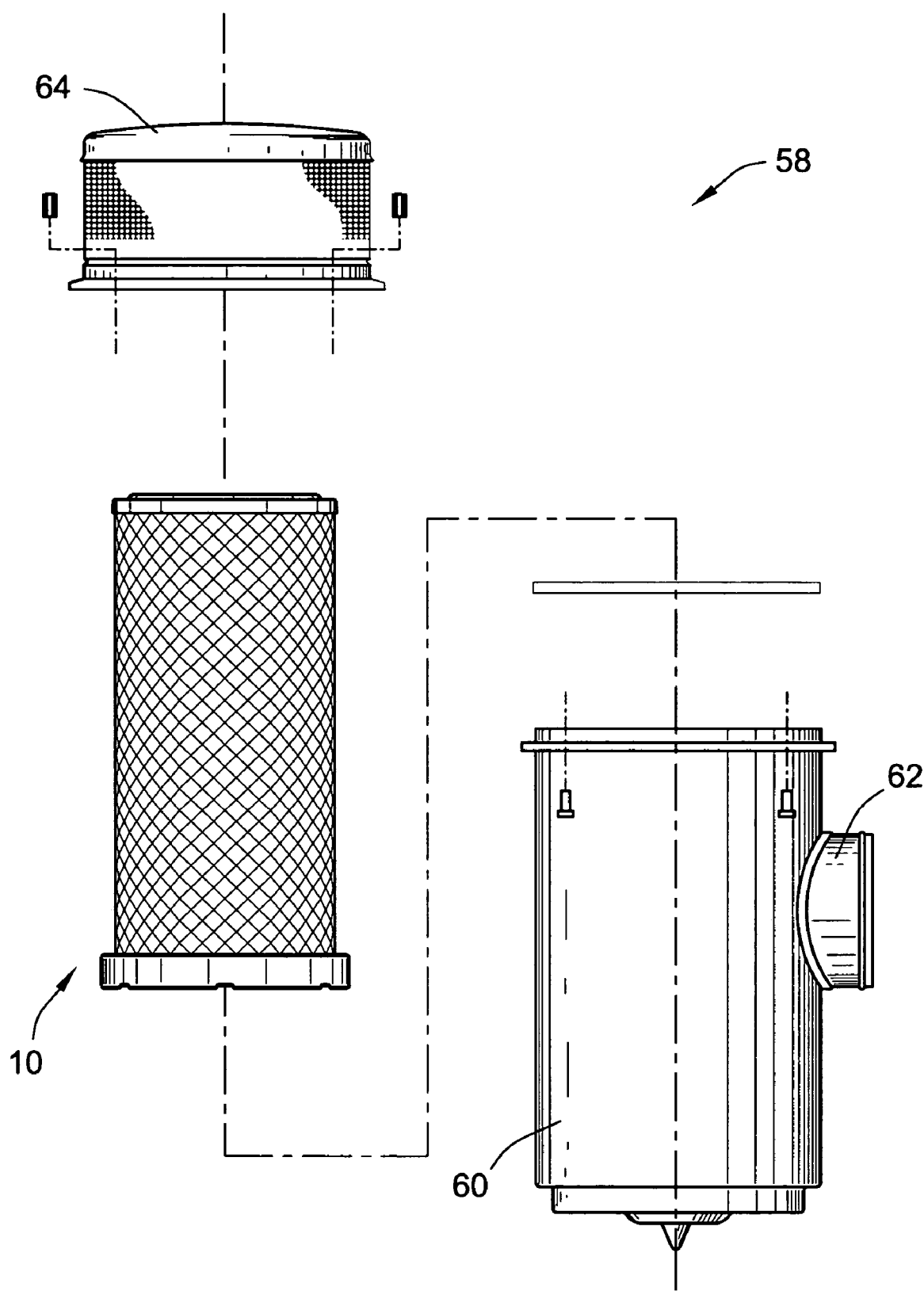
FIG. 6 is an exploded plan view of an air filtration system employing the air filter element of FIG. 1.

In one embodiment, as shown in FIG. 4, the annular groove 34 in the underside 36 of the composite end cap 20 includes a plurality of transverse ribs 46. The plurality of transverse ribs 46 may inhibit and/or prevent a seal from forming between the composite end cap 20 and a housing 60 (FIG. 6). Because the transverse ribs 46 may inhibit and/or prevent the formation of a seal between the air filter element 10 and the housing 60, no negative pressure or vacuum is created in the housing and removal of the air filter element 10 quick and easy.

As shown collectively in FIGS. 2 and 4, the flashing 38 causes a true inner diameter portion 48 to be formed in the composite end cap 20 proximate the central aperture 30 of the annular insert 26. The true inner diameter portion 48 has, similar to the outer periphery 40, a constant diameter portion and a flash urethane portion.

Figure 5:
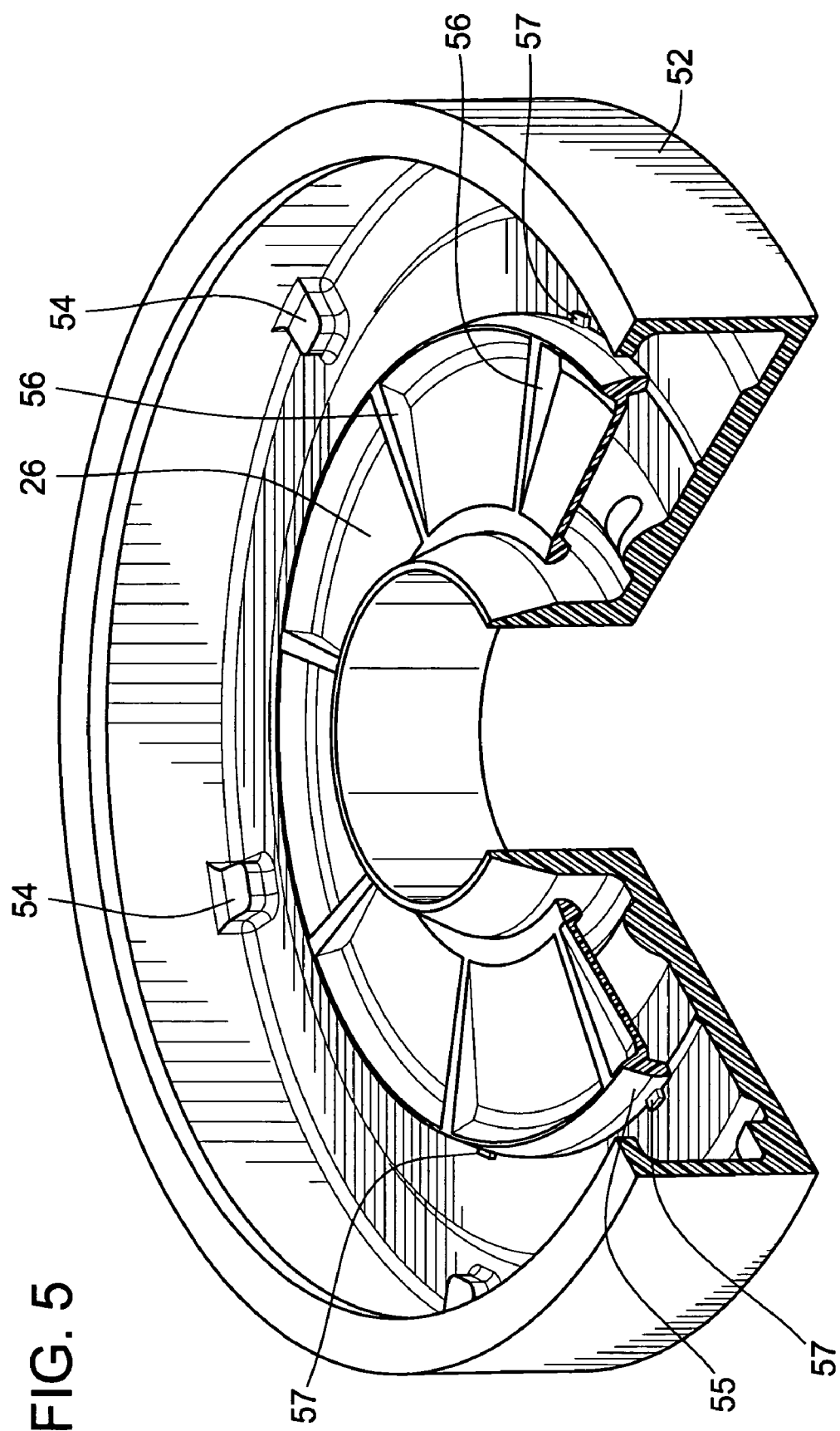
FIG. 5 is a perspective view of a mold, including a cut-away portion, used to construct the air filter element of FIG. 1, the mold having an annular insert, including a cut-away portion, from a composite end cap of the air filter element of FIG. 1 disposed therein.

As shown in FIG. 5, a mold 52 can be employed to construct the air filter element 10. The mold 52 comprises stand-offs 54 and is shown with the annular insert 26 disposed therein. When the air filter element 10 is constructed, the inner and outer liners 12, 14, and the filter media 16 are potted or set within the mold 52, preferably upon the stand-offs 54 and the annular insert 26 at the outer insert periphery 32. The foaming urethane, guided by the mold 52, flows over and around the inner and outer liners 12, 14, the filter media 16, and the stand-offs 54. When the foaming urethane cures (i.e., hardens), the inner and outer liners 12, 14, are secured within the composite end cap 20. Because the foaming urethane expands as it cures, the foaming urethane is desirably pushed up, and expands into, the filter media 16 proximate the end cap 20 such that the filter media is sealed. The absence of venting increases the force or push up pressure which can provide for a better sealing interface between the filter media 16 and the end cap 20. In addition, the amount of urethane will be reduced over a vented design.

Since the mold 52 only permits the foaming urethane to expand proximate the outer liner periphery 22 and the central aperture 30, the flashing 38, 39 occurs at those locations. Advantageously, the upward bottom taper of the annular insert 26 buoyantly biases any entrained air or suspended air bubbles upwardly toward the central aperture 30. Therefore, air bubbles are vented proximate the central aperture 30. The upward bottom taper avoids trapping of air bubbles. It also directs air bubbles away from the filter media 16 during molding. Even so, air bubbles can also vent proximate the outer liner periphery 22 as well.

The mold 52 may include a raised well 53. The raised well 53 concentrates the material around the outer perimeter to form the seal. The well 53 reduces the overall quantity of material to create the end cap.

With reference to FIGS. 2 and 5, in one embodiment, the annular insert 26 includes a plurality of radially outwardly extending ribs 56. These radially outwardly extending ribs 56 provide, among other benefits, structural support to the annular insert 26. Further, because the mold 52 includes the stand-offs 54 (FIG. 5), the composite end cap correspondingly includes a plurality of notches 50 as shown in FIG. 4 when the air filter element 10 has been removed from the mold 52. As best shown in FIG. 5, in one embodiment, the annular insert 26 includes a periphery 55 having an offsets 57. The offsets 57 are employed to position the annular insert 26 coaxially relative to the filter media 16 (FIG. 2) and to hold the annular insert 26 in position relative to the inner liner 12.

Referring to FIG. 6, an example of an air filtration system 58 is illustrated. As shown, the air filtration system 58 includes a housing 60, a flow tube 62, a cover 64, and the air filter element 10. When the air filtration system 58 is assembled, the air filter element 10 is placed in the housing 60 and, thereafter, the cover 64 is secured to the housing. The transverse ribs 46 on the air filter element 10 inhibit and/or prevent a seal from forming between the air filter element and the housing 60.

When the filter is installed in the housing 60 and the cover 64 is tightened, axial and/or radial seals are formed by both the end caps 18, 20 to prevent short circuitry of air past the filter media 16. With the air filter element 10 in the housing 60, air flows in cover 64 and passes through the air filter element 10 such that debris, contaminants, impurities, and the like are removed from the air supply. The air then flows through the air flow tube 62. Therefore, clean air can be provided to, for example, an internal combustion engine.

Figure 7:
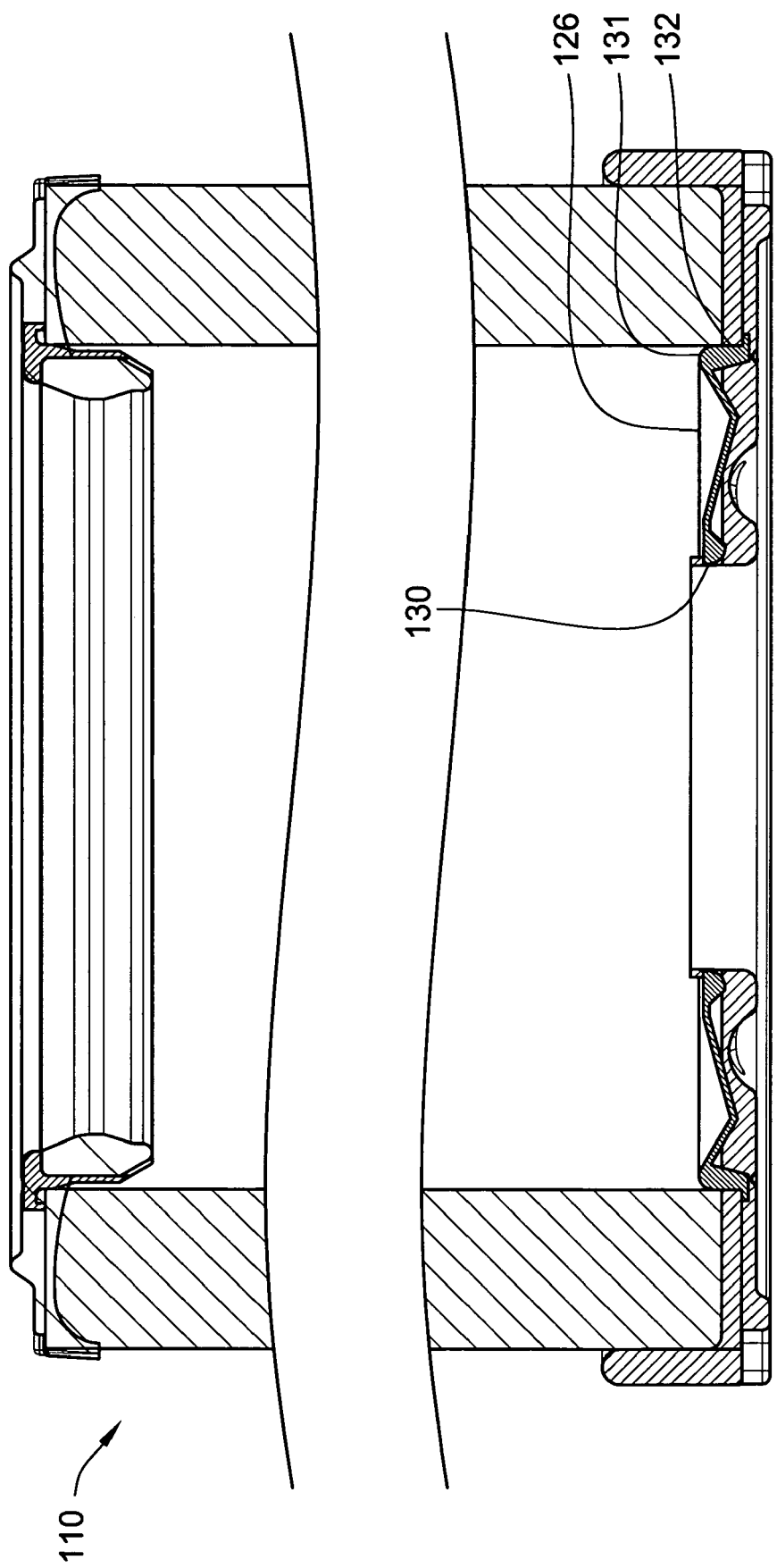
FIG. 7 is a side cross-section view of another embodiment of the air filter element.
Figure 8:
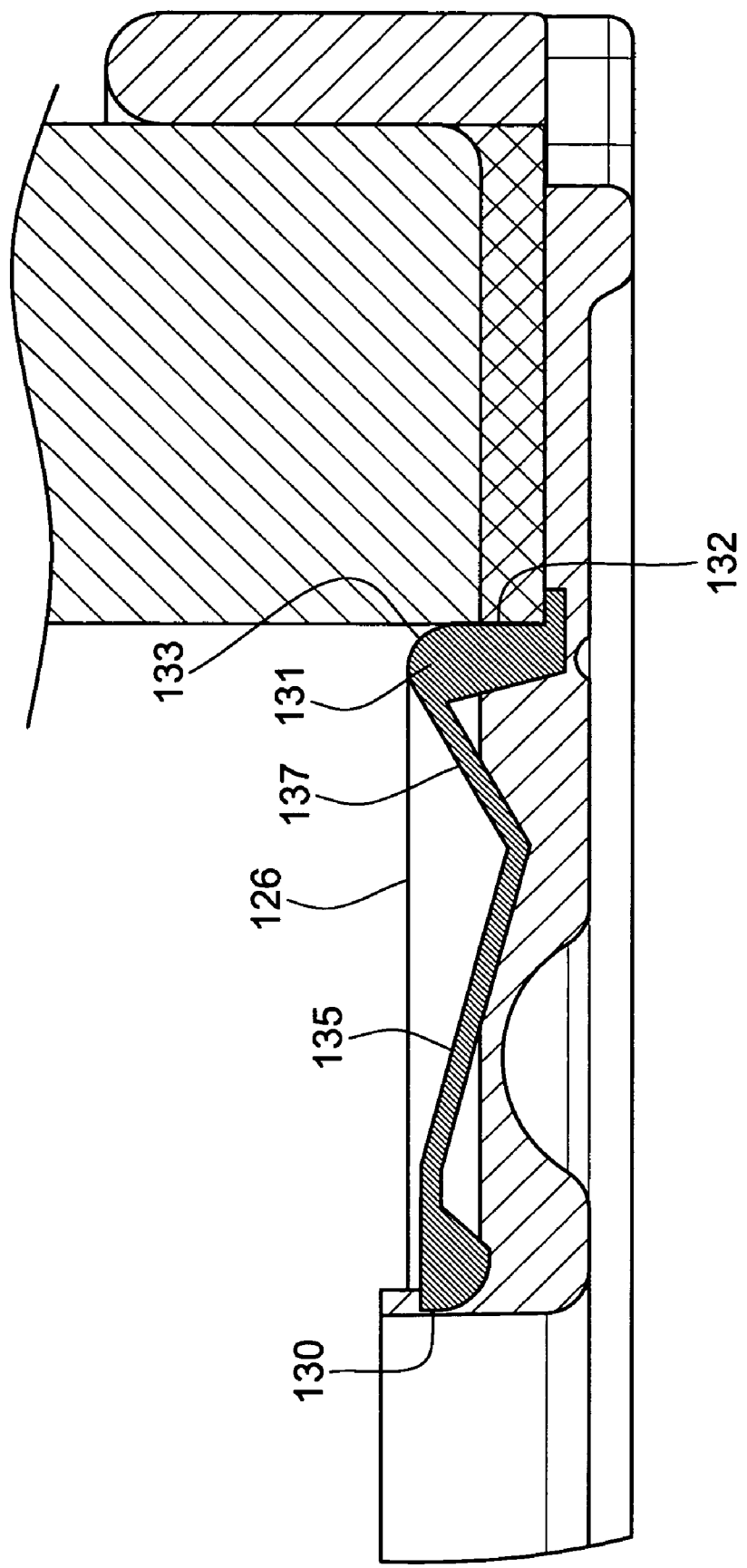
FIG. 8 is an enlarged view of the lower right corner of FIG. 7.
Figure 9:
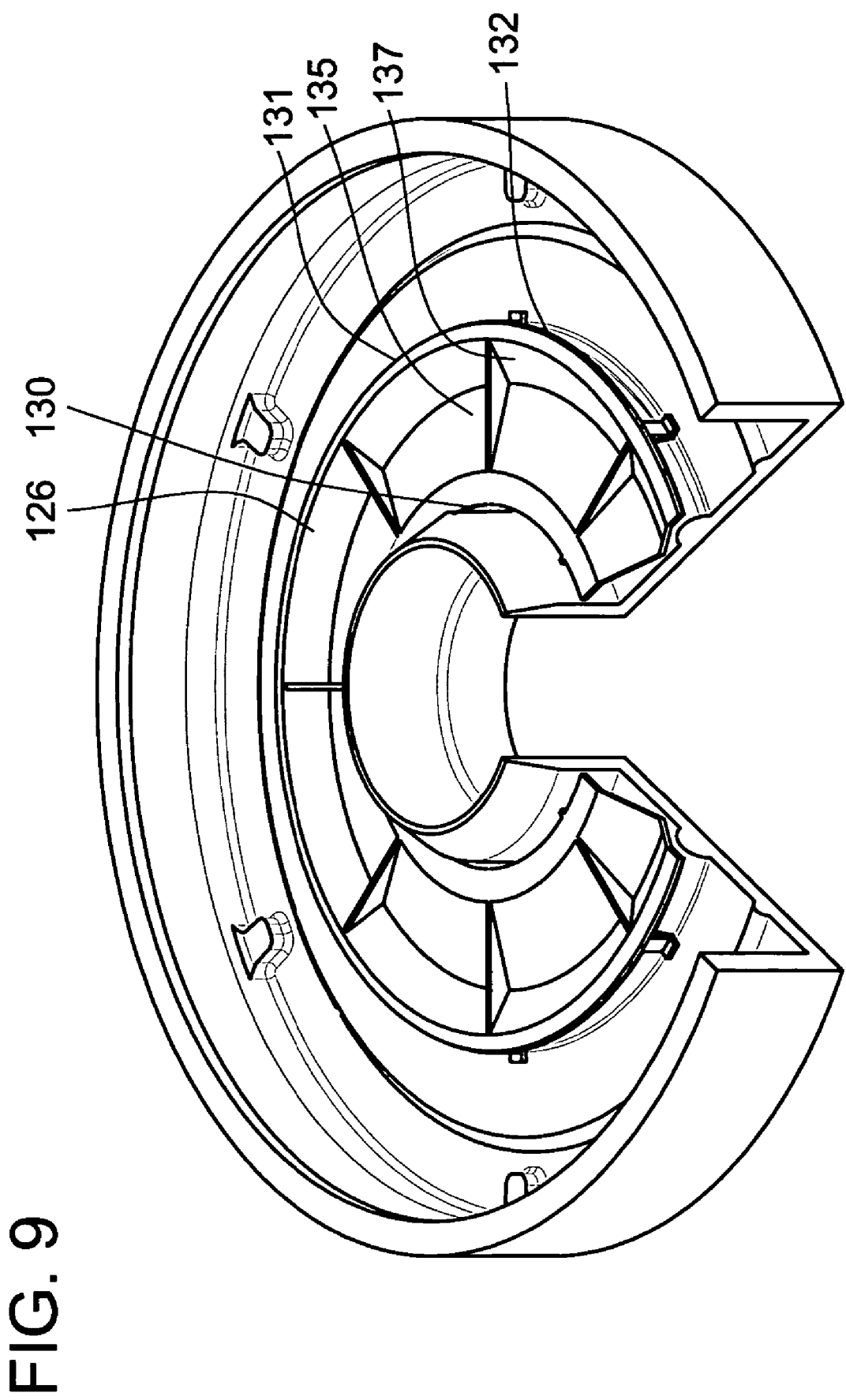
FIG. 9 is a perspective view of a mold, including a cut-away portion, used to construct the air filter element and including the annular insert.

Another embodiment of the filter element is shown in FIG. 7. The filter element 110 is similar to the embodiment shown in FIG. 2 except for the insert 126. Referring to FIGS. 7 and 8, the insert 126 has a central aperture 130 and an outer insert periphery 132. The outer periphery 132 may include a wall 131. The wall 131 may include a rounded portion 133. The insert 126 is tapered upwardly along surface 135 toward the central aperture 130. The surface 135 is tapered upwardly between 2 and 20 degrees, in a second range between about 5 and 15 degrees and in one embodiment, at about 15 degrees. The insert 126 may include another tapered surface 137 which tapers downwardly from the outer periphery 132 toward the tapered surface 135.

Figure 10:
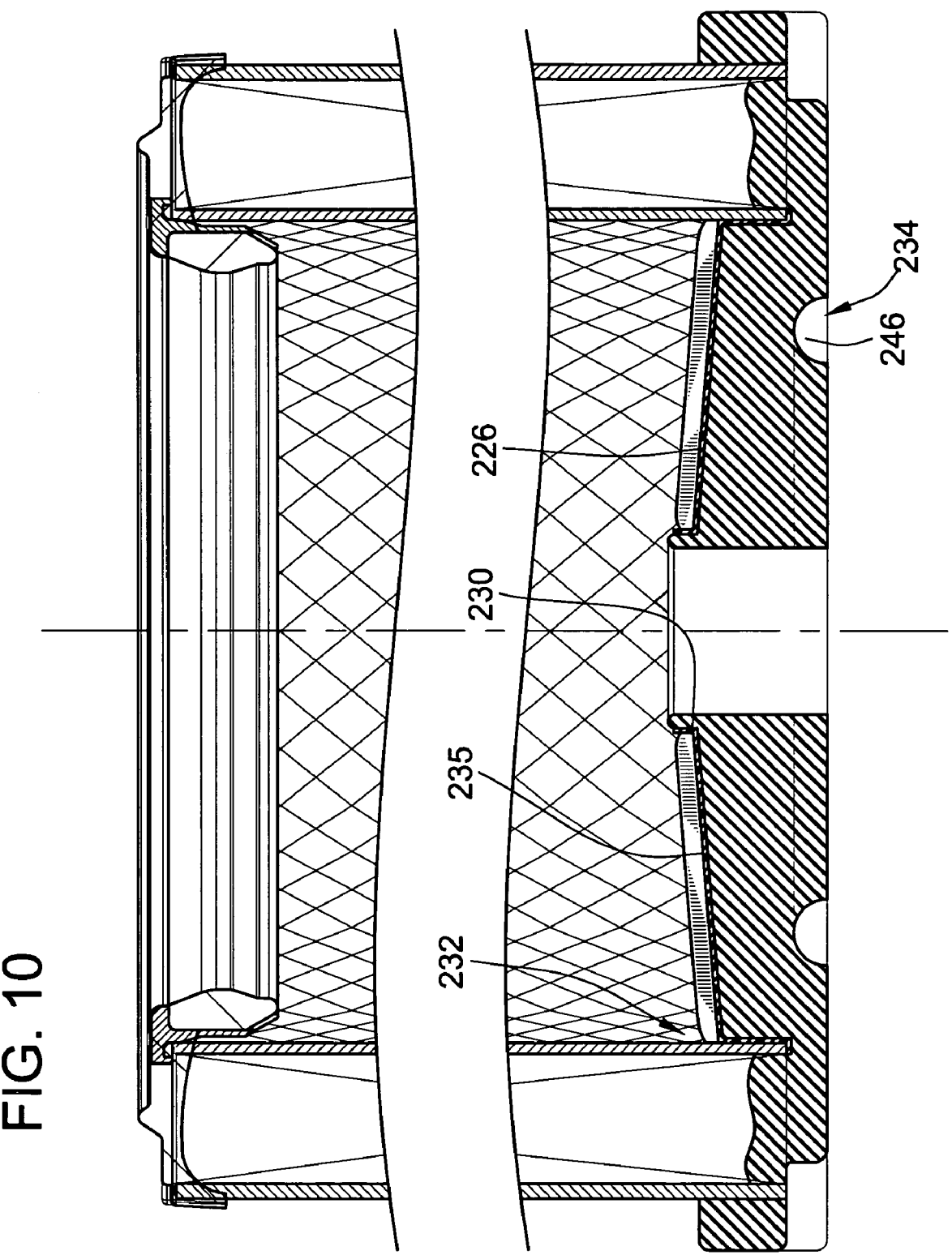
FIG. 10 is a side cross-section view of another embodiment of the air filter element.
Figure 12:
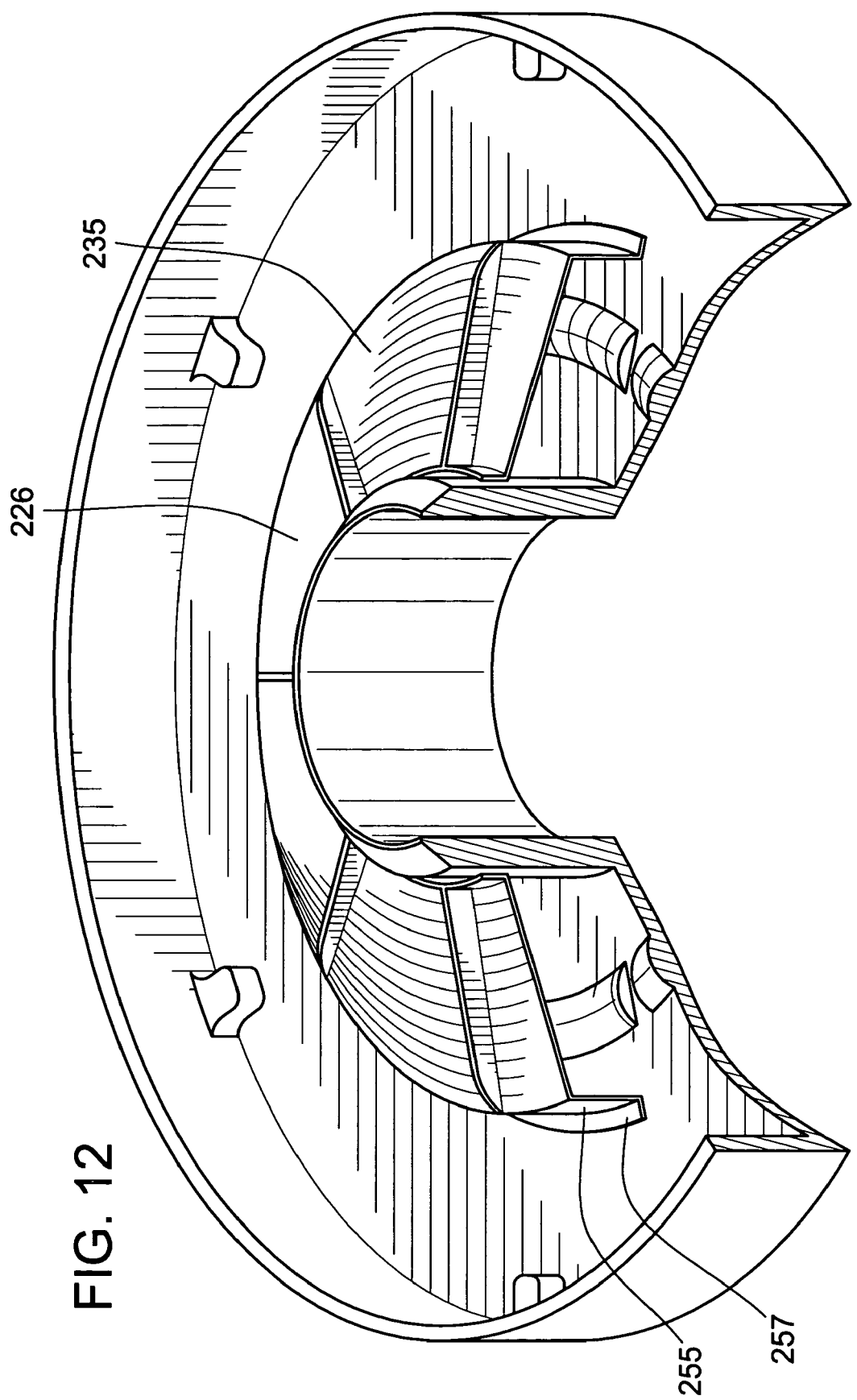
FIG. 12 is a perspective view of a mold, including a cutaway portion, used to construct the air filter element of FIG. 10, the mold having an annular insert, including a cut-away portion, from a composite end cap of the air filter element of FIG. 10 disposed therein.

Another embodiment of the filter element is shown in FIG. 10. The filter element 210 is similar to the embodiment shown in FIG. 2 except for the nert 226. The inert 226 has a central aperture 230 and an outer insert periphery 232. The annular insert 226 is tapered upwardly along surface 235 from the outer inert periphery 232 toward the central aperture 230. The annular insert 226 is upwardly tapered between 2 and 20 degrees, and in a second range between 5 and 15 degrees and in one embodiment at about 10 degrees. In one embodiment, the annular inert 226 may include a cylindrical periphery 255 with an offset 257 as shown in FIG. 12.

Figure 11:
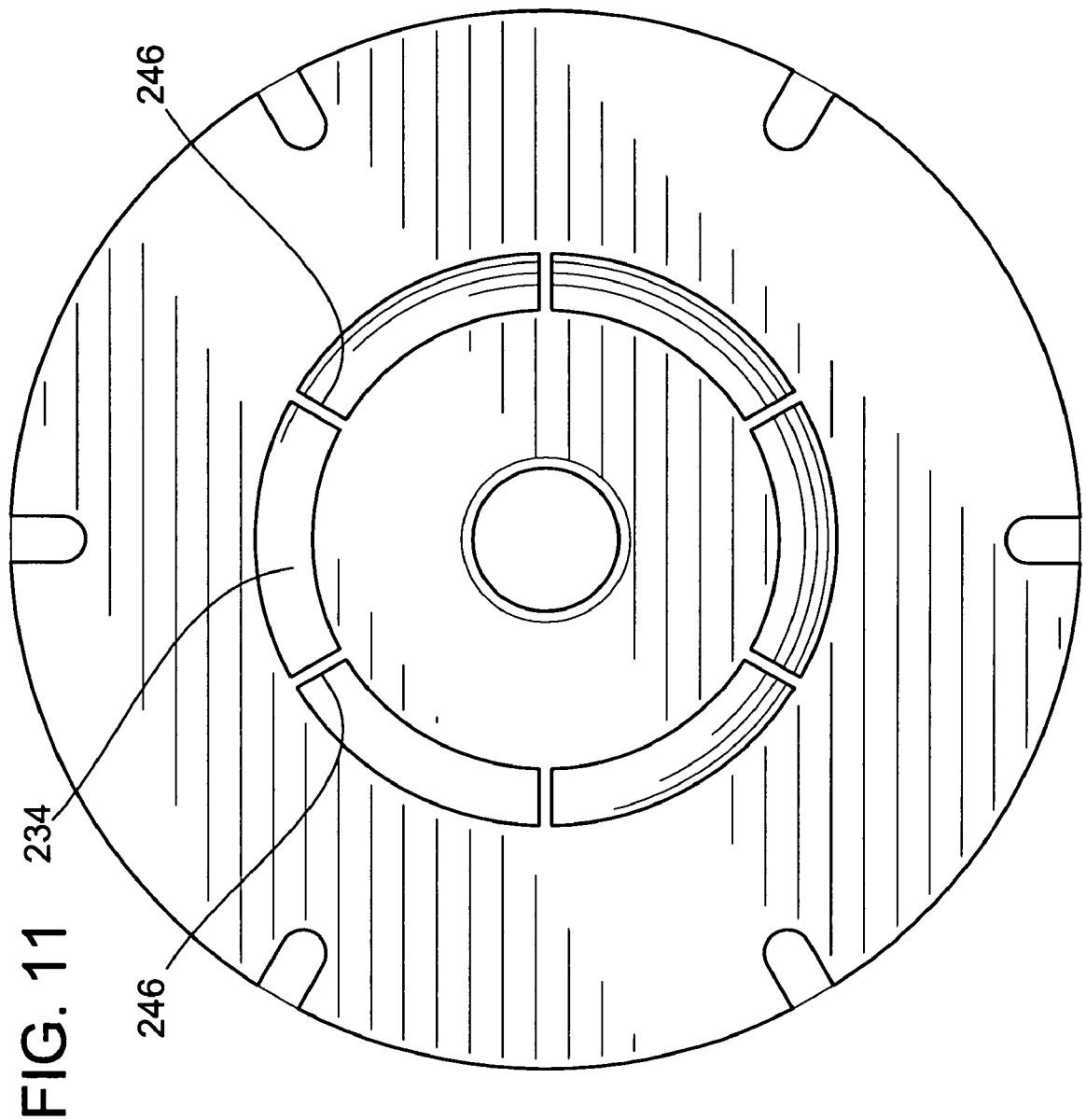
FIG. 11 is a bottom plan view of the air filter element of FIG. 9.

In one embodiment, as shown in FIG. 11, an annular groove 234 may include transverse ribs 246. The transverse ribs 146 may inhibit and/or prevent and seal from forming between the end cap and the housing.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An air filter element comprising:
   a tubular ring of pleated filter media extending between first and second ends;
   a first annular end cap located over the first end such that the first end is sealed; and
   a second composite end cap comprising:
      an annular insert having a central aperture and an outer insert periphery, the annular insert having a tapered surface internally of the pleated filter media tapering axially outward from the central aperture as the tapered surface extends away from the first annular end cap; and
      a foamed polymeric portion molded about the annular insert such that the second end is sealed, the foamed polymeric portion projecting along and engaging the tapered surface toward the central aperture and extending radially inward along the tapered surface.

2. The air filter element of claim 1, wherein the annular insert is downwardly tapered between about two and twenty degrees.

3. The air filter element of claim 1, wherein the annular insert is downwardly tapered between about five and fifteen degrees.

4. The air filter element of claim 1, wherein the annular insert is downwardly tapered about ten degrees.

5. The air filter element of claim 1, wherein the foamed polymeric portion comprises a foaming urethane.

6. The air filter element of claim 1, wherein bubbles associated with the foamed polymeric portion, when uncured, are vented through the central aperture such that substantially no air pockets are formed between the foamed polymeric portion and the annular insert.

7. The air filter element of claim 1, wherein a top portion of the annular insert includes a plurality of radially outwardly extending ribs.

8. The air filter element of claim 1, wherein the foamed polymeric portion has a constant diameter portion and a flash portion.

9. The air filter element of claim 1, wherein the air filter element includes flashing proximate the central aperture of the annular insert.

10. The air filter element of claim 1, wherein the annular insert includes a cylindrical periphery having an offset, the offset locating the annular insert coaxially relative to the filter media.

11. The air filter element of claim 1, wherein the annular insert is free of vent holes.

12. The air filter element of claim 1, wherein the annular insert is plastic.

13. An air filter element comprising:
an inner liner;
an outer liner concentrically spaced outside the inner liner, the outer liner defining an outer liner periphery;
a filter media disposed between the inner and outer liners;
an annular end cap formed over the inner and outer liners such that the inner and outer liners are secured and at least a portion of the filter media is sealed; and
a composite end cap comprising:
an annular plastic insert having a central aperture and an outer insert periphery, the annular plastic insert tapered downwardly from proximate the central aperture toward the outer insert periphery; and
a foamed urethane portion molded about the annular plastic insert such that the inner and outer liners are secured, at least a portion of the filter media is sealed, and urethane flashing occurs through the central aperture and along the outer liner periphery, the foamed urethane portion therefore having a foamed periphery that includes a constant diameter portion and a flashed urethane portion.

14. The air filter element of claim 13, wherein an annular groove is formed on an underside of the composite end cap, the annular groove having a plurality of transverse ribs therein.

15. The air filter element of claim 13, wherein the annular plastic insert is downwardly tapered between about two and twenty degrees.

16. The air filter element of claim 13, wherein the annular plastic insert is downwardly tapered between about five and fifteen degrees.

17. The air filter element of claim 13, wherein the annular plastic insert is solid and free of vent holes.

18. An air filtration system comprising:
a housing; and
an air filter element including:
an inner metal liner;
an outer metal liner concentrically spaced outside the inner metal liner, the outer metal liner defining an outer liner periphery;
a filter media disposed between the inner and outer metal liners;
an annular end cap formed over the inner and outer metal liners such that the inner and outer metal liners are secured and at least a portion of the filter media is sealed; and
a composite end cap comprising:
an annular plastic insert having a central aperture and an outer insert periphery, the annular plastic insert tapered upwardly from proximate the outer insert periphery toward the central aperture; and
a foamed urethane portion forming a central urethane aperture, the foamed urethane portion molded about the annular plastic insert such that the inner and outer metal liners are secured, at least a portion of the filter media is sealed, an annular groove is formed on an underside of the composite end cap, the annular groove having a plurality of transverse ribs therein, and urethane flashing occurs through the central aperture and along the outer liner periphery, the foamed urethane portion therefore having a foamed periphery that includes a constant diameter portion and a flashed urethane portion.

19. The air filtration system of claim 18, wherein the annular plastic insert is solid and free of vent holes.

20. The air filtration system of claim 18, wherein the annular plastic insert is one of tapered between two and twenty degrees, tapered between five and fifteen degrees, and tapered about ten degrees.

* * * * *

UNITED STATES PATENT AND TRADEMARK OFFICE
CERTIFICATE OF CORRECTION

PATENT NO. : 7,628,837 B2 Page 1 of 1
APPLICATION NO. : 11/253965
DATED : December 8, 2009
INVENTOR(S) : Brian T. Ehrenberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this

Twenty-first Day of December, 2010

David J. Kappos
*Director of the United States Patent and Trademark Office*